United States Patent [19]

Ichikawa

[11] Patent Number: 4,736,256
[45] Date of Patent: Apr. 5, 1988

[54] METHOD FOR RECORDING AND FOR CONFIRMING THE RECORDING OF IMAGES IN AN IMAGE FILING APPARATUS

[75] Inventor: Kaori Ichikawa, Koganei, Japan
[73] Assignee: Olympus Optical Co., Ltd., Japan
[21] Appl. No.: 771,903
[22] Filed: Sep. 3, 1985
[30] Foreign Application Priority Data Sep. 21, 1984 [JP]  Japan .................................. 59-196541

[51] Int. Cl.$^4$ .......................... H04N 5/76; G11B 7/00
[52] U.S. Cl. ..................................... 358/335; 358/342;
358/102; 358/903; 358/296; 360/35.1
[58] Field of Search ............... 358/335, 342, 102, 903,
358/296; 369/32, 33; 360/35.1

[56] References Cited

U.S. PATENT DOCUMENTS

| 4,262,301 | 4/1981 | Erlichman . | |
|---|---|---|---|
| 4,437,127 | 3/1984 | Hirose | 358/296 |
| 4,456,931 | 6/1984 | Toyoda et al. | 358/335 |
| 4,555,803 | 11/1985 | Hirose | 358/335 X |
| 4,574,395 | 3/1986 | Kato | 235/375 X |
| 4,636,848 | 1/1987 | Yamamoto | 358/102 |

FOREIGN PATENT DOCUMENTS

| 0051218 | 5/1982 | European Pat. Off. . |
| 2659042 | 4/1981 | Fed. Rep. of Germany . |
| 3311663 | 10/1983 | Fed. Rep. of Germany . |
| 2087194 | 5/1982 | United Kingdom . |
| 2089169 | 6/1982 | United Kingdom . |

OTHER PUBLICATIONS

Examiner's report to the Comptroller under section 17(5); Application No. 8523260.

Primary Examiner—Robert L. Richardson
Attorney, Agent, or Firm—Parkhurst & Oliff

[57] ABSTRACT

In an image filing apparatus having a reproducing mode for reproducing the already recorded image and a first recording mode for recording image signals supplied from an image pick-up device while the image supplied from the image picking-up device is always displayed on a display unit, there is provided a second recording mode in which just after an image signal is recorded on an optical disc, the thus recorded image signal is automatically read out and is displayed on the display unit for a predetermined time interval, and then the currently picked-up image is displayed on the display unit to start the recording operation of the next image. Therefore, it is possible to confirm whether or not the recorded image is correctly recorded in an easy and swift manner.

7 Claims, 2 Drawing Sheets

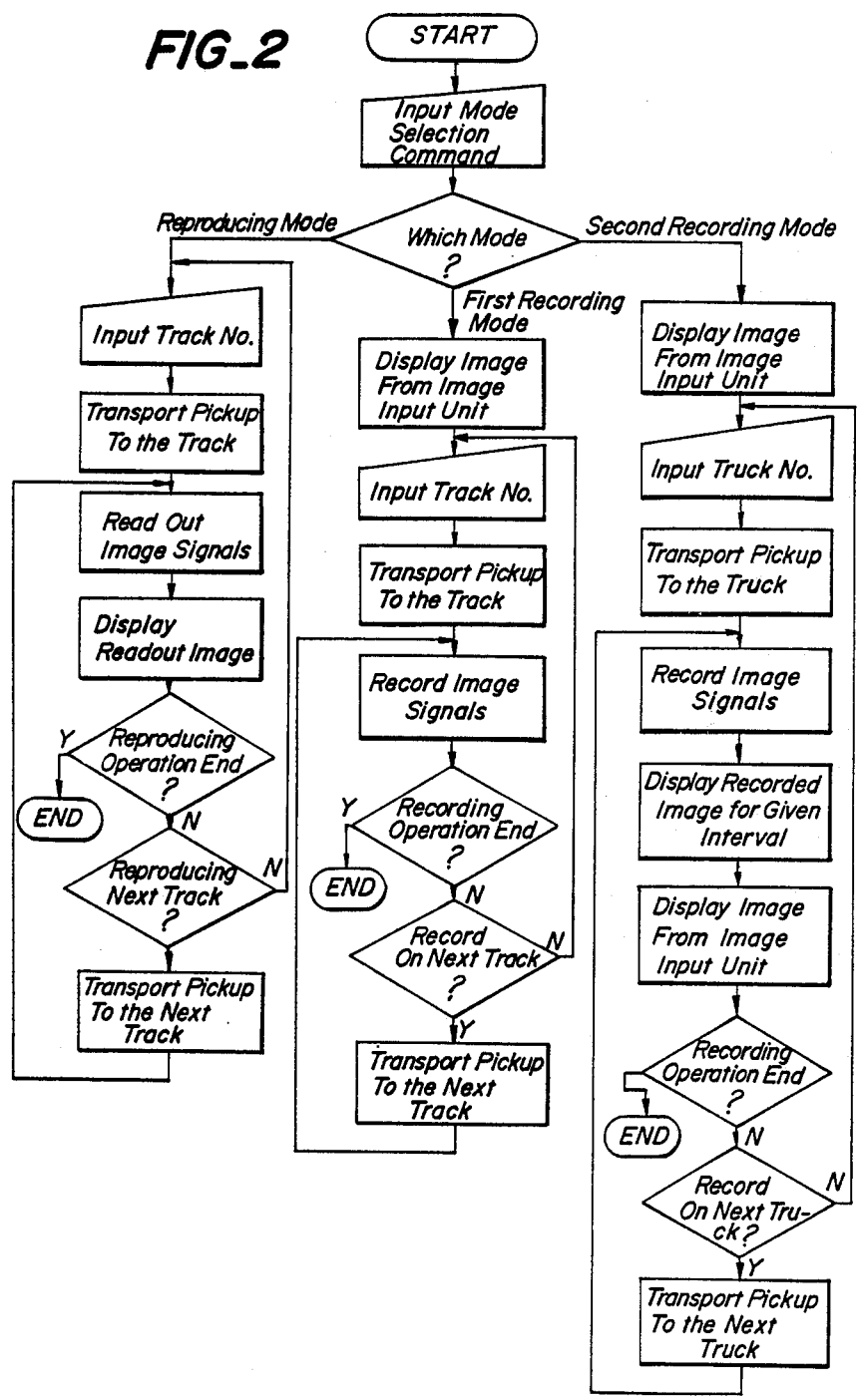

METHOD FOR RECORDING AND FOR CONFIRMING THE RECORDING OF IMAGES IN AN IMAGE FILING APPARATUS

BACKGROUND OF THE INVENTION

Field of the Invention and Related Art Statement

The present invention relates to an image filing apparatus.

Recently, as to a medical treatment system, there has been proposed an image filing apparatus in which medical images taken by an endoscope image pick-up device, an X-ray image pick-up device, etc. are filed one by one by means of a computer, and such image filing apparatus is used for a diagnosis or a management of case history. However, in the know image filing apparatus for effecting image recording and image reproducing operations, use is made of only two modes i.e. a recording mode for recording the image and a reproducing mode for reproducing the recorded image, and thus in order to confirm whether or not the image is normally recorded, or whether or not the desired image is recorded it is necessary to change the mode from the recording mode to the reproducing mode and then to reproduce the recorded image after setting a filing number etc. of the recorded image. Then, the reproducing mode has to be returned into the recording mode prior to recording of a next image. Therefore, there occurs a drawback that a confirming operation of the recorded image is not effected in an easy and swift manner.

SUMMARY OF THE INVENTION

The present invention has for its object to eliminate the drawbacks mentioned above and to propose an image filing apparatus in which one frame of the recorded image can be confirmed in an easy and swift manner.

According to the invention, an image filing apparatus comprises, means for recording image signals of respective one frame on a record medium;

means for reproducing an image signal of one frame recorded on the record medium to generate a reproduced image signal;

means for displaying the reproduced image signal of one frame as a still picture on a display screen; and means for controlling said recording means, reproducing means and displaying means in such a manner that immediately after an image signal of one frame has been recorded on the record medium by said recording means, the image signal of one frame thus recorded is automatically reproduced from the record medium by said reproducing means and is automatically displayed on said display screen as a still picture for a predetermined time interval during which a displayed still picture image can be confirmed.

BRIEF DESCRIPTION OF THE DRAWINGS

FIG. 2 is a flow chart for explaining an operation of the image filing apparatus according to the invention.

DESCRIPTION OF THE PREFERRED EMBODIMENTS

Figure 1:
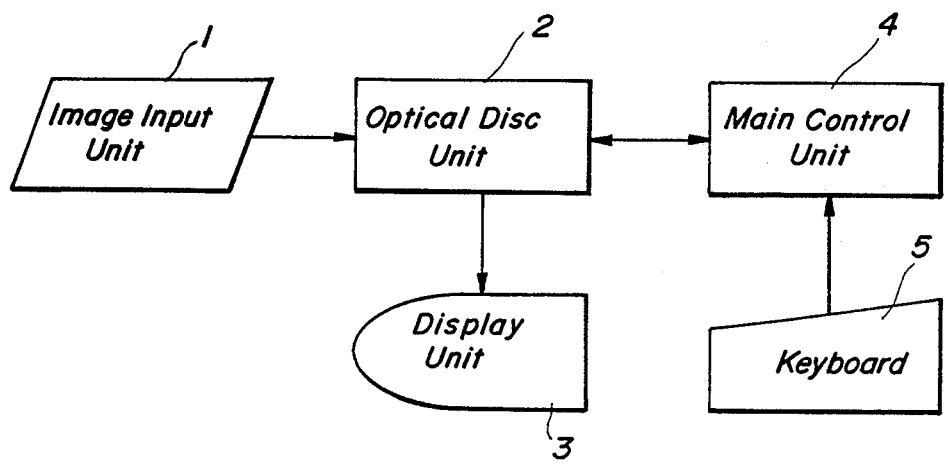
FIG. 1 is a block diagram showing one embodiment of the image filing apparatus according to the invention.

FIG. 1 is a block diagram showing one embodiment of the image filing apparatus according to the invention. In this embodiment, the image filing apparatus comprises an image input unit 1 such as a television camera using, for example solid state image pick-up elements, an optical disc unit 2, a display unit 3, a main control unit 4 having CPU, memory, etc. and a keyboard 5. Moreover, in this embodiment, there are provided three modes i.e. a reproducing mode in which tracks on which the image signals of still pictures have been recorded are read out by using a laser beam and the read-out still picture image signal is displayed on the display unit 3, a first recording mode in which image signals supplied from the image input unit 1 are recorded on unrecorded tracks of the optical disc of the optical disc unit 2 by a command supplied from the keyboard 5 while the image supplied from the image input unit 1 is always displayed on the display unit 3, and a second recording mode in which just after an image signal of one still picture-frame has been recorded on an unrecorded track of the optical disc, the image signal thus recorded is automatically read out by using the laser beam and the relevant still picture is displayed on the display unit 3 for a predetermined time interval during which an operator can confirm the recorded image, and then the optical disc unit 2 is automatically returned into such a condition that a next image signal supplied from the image input unit 1 may be displayed on the displaying unit 3 and may be recorded on the optical disc. All the operations of respective modes are controlled by the main control unit 4.

Hereinafter, an operation of the image filing apparatus shown in FIG. 1 will be explained with reference to a flow chart illustrated in FIG. 2.

At first, the desired made is selected by a command supplied from the keyboard 5. If the reproducing mode is selected, a track No. of the optical disc set in the optical disc unit 2 on which an image signal of a still picture to be reproduced is recorded is inputted from the keyboard 5. When the track No. is inputted, a pickup of the optical disc unit 2 is transported into a track position corresponding to the inputted track No. and the image signal recorded on the relevant track is reproduced, and the reproduced image signal is supplied to the display unit 3 and the desired still picture is displayed on its display screen. After the display of the image is ended, a command representing whether the reproducing operation is ended or not is inputted from the keyboard 5. In this case, if the command shows the end of the reproducing operation, the operation is ended, and if the command shows the continuation of the reproducing operation, a command representing whether an image signal of a still picture to be reproduced next has been recorded on a next track or not is further inputted from the keyboard 5. In this case, if the image signal has been recorded on the next track, the pickup is transported into the next track to start the same reproducing operation as mentioned above. Contrary to this, if the image signal is not contained on the next track, a track No. of the image to be reproduced next is inputted from the keyboard 5, and then the same reproducing operation as mentioned above is effected.

When the first recording mode is selected, the image currently picked-up in the image input unit 1 is displayed on the display unit 3. Then, a track No. of the optical disc on which the relevant image is to be recorded is inputted from the keyboard 5 to transport the pickup into the track corresponding to the inputted track No. Then, by operating a predetermined key on the keyboard 5, the image signal of the relevant still picture is, for example frequency-modulated and the frequency-modulated image signal is recorded on the optical disc. After the recording operation of the image is ended, a command representing whether the recording operation is ended or not is inputted from the keyboard 5. In this case, if the command shows the end of the recording operation, the operation is ended, and if the command shows the continuation of the recording operation, a command representing whether or not a track on which an image signal is to be recorded next is a track which is next to the track on which the image signal has been recorded last is further inputted from the keyboard 5. In this case, if the track is the next track, the pickup is transported into the next track to start the same recording operation of the desired image as mentioned above. Contrary to this, if the track to be recorded next is not the next track, a track No. of the image to be recorded next is inputted from the keyboard 5, and then the same recording operation as mentioned above is effected.

Further, if the second recording mode is selected, the image currently picked-up by the image input unit 1 is displayed on the display unit 3 as is the same as the first recording mode. Under such a condition, a track No. of the optical disc to be recorded is inputted from the keyboard 5 to transport the pickup into a track corresponding to the inputted track No. Then, by operating a predetermined key on the keyboard 5, an image signal of the relevant still picture of one frame is recorded on the optical disc in the same manner as that of the first recording mode. However, in the second recording mode, the thus recorded image signal of one frame is automatically read out at the end of the recording operation of the relevant image and a still picture is displayed on the display unit 3 for a predetermined time interval. This predetermined time interval for reproducing the just recorded image of one frame is controlled by a signal generation circuit which is actuated in synchronism with the end of the recording operation to produce a pulse having a predetermined time period and the reproduction of the still picture is continued as long as the pulse is generated. The predetermined time period is so set that during this period the operator can confirm the recorded still picture.

After the still picture recorded last is displayed on the display unit 3 for the predetermined time interval, an image currently picked-up in the image input unit 1 is then displayed on the display unit 3. Under such a condition, a command representing whether the recording operation is ended or not is inputted from the keyboard 5. In this case, if the command shows the end of the recording operation, the operation is ended, and if the command shows the continuation of the recording operation, a command representing whether or not a track on which an image is to be recorded next is a track next to the track on which the image has been recorded last is further inputted from the keyboard 5. In this case, if the track to be recorded next is the next track, the pickup is transported into the next track to start the same recording operation of the desired image as mentioned above, and then the thus recorded image is automatically reproduced and displayed on the display unit 3 for the predetermined time interval. Contrary to this, if the track to be recorded next is not the next track, a track No. of the image to be recorded next is inputted from the keyboard 5. Then, the same recording operation as mentioned above is effected, and also the thus recorded image is automatically reproduced and displayed on the display unit 3 for the predetermined time interval.

In this embodiment, since use is made of the second recording mode mentioned above, it is possible to confirm whether or not the recorded image has been correctly recorded in an easy and swift manner even in the recording mode.

The present invention is not limited to the embodiments mentioned above, but various modifications are possible. For example, in the embodiment mentioned above, use is made of the optical disc as a record medium, but it is possible to use a magnetic record medium instead of the optical disc. Further, in this invention, although the image signals are recorded on the record medium as respective still picture signals, the image input unit 1 may generate still picture image signals or motional image signals.

As mentioned above, according to the invention, since the image signal which has been recorded last is automatically reproduced and displayed on the display unit for the predetermined time interval just after the relevant image signal has been recorded on the record medium, it is possible to confirm whether or not the image is correctly recorded in an easy and swift manner.

What is claimed is:

1. A method for recording and for confirming the recording of images in an image filing apparatus comprising the steps of:
   recording image signals of respective single frames on a record medium;
   reproducing an image signal of a single frame recorded on the record medium to generate a reproduced image signal;
   displaying the reproduced image signal of said single frame as a still picture on a display screen; and
   controlling said recording, reproducing and displaying steps in such a manner that immediately after an image signal of a single frame has been recorded on the record medium during said recording step, said reproducing and displaying steps are performed whereby the image signal of said single frame is automatically reproduced from the record medium during said reproducing step and is automatically displayed on said display screen during said displaying step as a still picture for a predetermined time interval during which said recorded image signal can be confirmed.

2. A method for recording and for confirming the recording of images in an image filling apparatus according to claim 1, wherein said controlling step further comprises the steps of:
   inputing commands for operating said image filing apparatus selectively in one of three operation modes:
   a reproducing mode, wherein said reproducing step is performed to reproduce an image signal recorded on the record medium, and said displaying step is performed to display a still picture of the reproduced image signal on said display screen,
   a first recording mode wherein said recording step is performed to record an image signal of a single frame on the record medium, and a second recording mode wherein, immediately after an image signal has been recorded on the record medium during said recording step, the image signal thus recorded is automatically reproduced during the reproducing step, a still picture of the reproduced signal is automatically displayed on the display screen for the predetermined time interval during the displaying step, and then said recording step is performed to record an image signal of a subsequent single frame.

3. A method for recording and for confirming the recording of images in an image filing apparatus as recited in claim 2, wherein said inputing step further includes the step of supplying a track number corresponding to a track of the record medium on which an image signal of a single frame has been recorded on the record medium, and wherein said controlling step further includes the step of selectively reproducing an image signal recorded on the track of the record medium denoted by the inputed track number.

4. A method for recording and for confirming the recording of images in an image filing apparatus as recited in claim 3, wherein when image signals of a plurality of frames to be successively reproduced are recorded on successive tracks on the record medium, said inputting step is performed to input a track number only for a track corresponding to a first one of said plurality of frames.

5. A method for recording and for confirming the recording of images in an image filing apparatus as recited in claim 2, wherein said inputting step further comprises the step of supplying a track number denoting a track of the record medium, and wherein said controlling step further comprises the steps of selectively recording an image signal of said single frame on said track of the record medium denoted by the inputed track number.

6. A method for recording and for confirming the recording of images in an image filing apparatus as recited in claim 5, wherein when image signals of a plurality of frames to be successively reproduced are recorded on successive tracks of the record medium, said inputting step is performed to input a track number only for a track corresponding to a first one of said plurality of frames.

7. A method for recording and for confirming the recording of images in an image filing apparatus as recited in claim 1, wherein said controlling step further comprises the step of generating a pulse beginning at a time when an image signal of a single frame has just been recorded on the record medium, said pulse having a duration equal to the predetermined time interval during which said image signal just recorded is automatically reproduced during said reproducing step and displayed during said displaying step.

* * * * *